Figure 1:
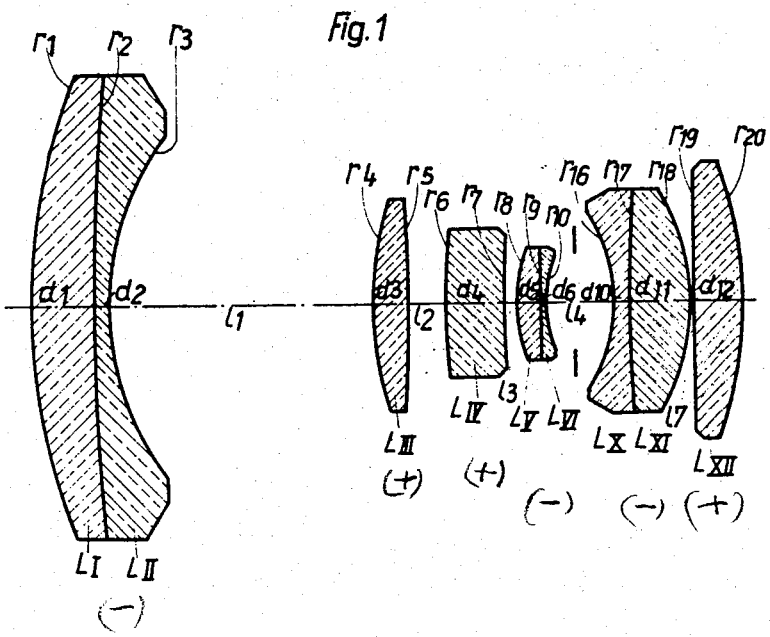

Feb. 5, 1957  G. LANGE  2,780,139
LENS SYSTEM FOR A PHOTOGRAPHIC OBJECTIVE
Filed Sept. 28, 1955

United States Patent Office 2,780,139
Patented Feb. 5, 1957

2,780,139
LENS SYSTEM FOR A PHOTOGRAPHIC OBJECTIVE

Günther Lange, Konigsbronn, Wurttemberg, Germany, assignor to Carl Zeiss, Heidenheim (Brenz), Wurttemberg, Germany Application September 28, 1955, Serial No. 537,115
Claims priority, application Germany September 30, 1954
4 Claims. (Cl. 88—57)

The problem underlying the present invention consists in the replacement, in a photographic objective of the Gauss type (modified in certain cases), called the basic objective, of the part of the lens system in front of the diaphragm by another partial system in such a way that the latter, in conjunction with the part of the system standing behind the diaphragm, which part system comprises a meniscus-shaped dispersive component turning its convex surface bordering on air towards the image side, and a collective outer component, results in a photographic objective which with the same focal intercept shows a shorter focal length than the basic objective.

According to the present invention this replacement lens system producing the shortened focal length consists of four members separated by airspaces from each other, namely of a meniscus-shaped dispersive front member, of a biconvex collective second member, of a meniscus-shaped collective third member and of a meniscus-shaped dispersive fourth member, wherein the three meniscus-shaped members each turn their concave sides towards the diaphragm and wherein the front member is composed of two lenses of opposing refractive powers cemented to each other, wherein the dispersion of the glass of the collective lens is greater than the dispersion of the glass of the dispersive lens cemented to it, wherein furthermore the fourth member also consists of two lenses of opposing refractive powers cemented to each other, wherein the dispersion of the glass of the dispersive lens is greater than the dispersion of the glass of the collective lens cemented to it, and wherein finally the two radii of the external surfaces bordering on air of this fourth member differ from each other by not more than 15% of the focal length of the entire objective, and the vertex distance of the collective surface bordering on air of the fourth member from the collective surface bordering on air of the meniscus-shaped dispersive component of the remaining part-system of the basic objective lies between the limits of 35 and 55%, and the arithmetic mean of the absolute values of the said collective surfaces lying between 35 and 55% of the focal length of the whole objective, while the vertex distance of the two concave surfaces bordering on the diaphragm space lies between the limits of 35% and 70% of the harmonic mean of the absolute values of the radii of these two latter surfaces.

It is an advantage in an objective of this kind if at least one of the lenses cemented together in the front member consists of a glass of $n$-value larger than 1.65 and at least one of the lenses cemented together in the fourth member consists of a glass of $n$-value less than 1.65.

In an advantageous embodiment of a system according to the invention the second and third member are single uncemented lenses and consist of a glass of $n$-value less than 1.65.

In the appended illustrations two objectives are represented. Of these the one shown in Fig. 1 consists of a four-member lens system standing in front of the diaphragm according to the invention, and of a two-member system arranged behind the diaphragm wherein the latter is the same system contained in the objective shown in Fig. 2, the basic objective. Both objectives show the same focal intercept but different focal length wherein the focal length of the objective shown in Fig. 1 is the shorter.

In the tables given in the following the numerical values for the embodiment according to the invention (Fig. 1) are listed in Table 1 and those for the basic objective (Fig. 2) in Table 2. The latter in itself is not the object of the present invention.

In the illustrations and tables there are designated:

By $r$=the radii of the surfaces
By $d$=the thicknesses of the individual lenses
By $l$=the airspaces between the individual members
By $n_d$=the refractive indices
By $V$=the Abbe numbers.

Figure 2:
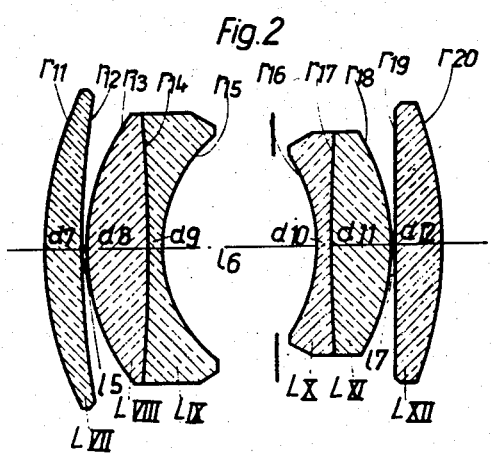

The focal length of the photographic system with the lens system according to the invention (Fig. 1) standing in front of the diaphragm equals $f=1$, while the focal length of the basic objective (Fig. 2) with the partial system behind the diaphragm identical is greater, in fact $f_1=1.415$; the aperture ratio of the objective according to Fig. 1 amounts to 1:4, that of the objective according to Fig. 2 amounts to 1:2. The focal intercept is the same in both cases, and its value related to the focal length $f$ of the objective according to the invention equals $1.046 \cdot f$.

Table 1

| Lenses | Radii | Thicknesses and Separations | $n_d$ | $V$ |
|---|---|---|---|---|
| $L_I$ | $r_1=+1.517700$ | $d_1=0.15153$ | 1.74000 | 28.2 |
|  | $r_2=+6.129710$ | $d_2=0.03031$ | 1.72005 | 50.3 |
| $L_{II}$ | $r_3=+0.687765$ | $l_1=0.66042$ |  |  |
|  | $r_4=+0.829261$ | $d_3=0.09386$ | 1.56399 | 58.1 |
| $L_{III}$ | $r_5=-4.277530$ | $l_2=0.09092$ |  |  |
|  | $r_6=+1.702890$ | $d_4=0.15153$ | 1.50137 | 56.5 |
| $L_{IV}$ | $r_7=-2.777720$ | $l_3=0.03031$ |  |  |
|  | $r_8=+0.386767$ | $d_5=0.05767$ | 1.56384 | 60.7 |
| $L_V$ | $r_9=\infty$ | $d_6=0.01824$ | 1.56732 | 42.8 |
| $L_{VI}$ | $r_{10}=+0.307207$ | $l_4=0.17271$ |  |  |
|  | $r_{16}=-0.398065$ | $d_{10}=0.03648$ | 1.75520 | 27.5 |
| $L_X$ | $r_{17}=+4.277530$ | $d_{11}=0.15888$ | 1.70187 | 40.98 |
| $L_{XI}$ | $r_{18}=-0.515788$ | $l_7=0.00294$ |  |  |
|  | $r_{19}=+23.371700$ | $d_{12}=0.11828$ | 1.74400 | 44.9 |
| $L_{XII}$ | $r_{20}=-0.964519$ |  |  |  |

Table 2

| Lenses | Radii | Thicknesses and Separations | $n_d$ | $V$ |
|---|---|---|---|---|
| $L_{VII}$ | $r_{11}=+0.878397$ | $d_7=0.09092$ | 1.66672 | 48.4 |
|  | $r_{12}=+2.254570$ | $l_5=0.00294$ |  |  |
| $L_{VIII}$ | $r_{13}=+0.538502$ | $d_8=0.16183$ | 1.62041 | 60.3 |
| $L_{IX}$ | $r_{14}=-4.277530$ | $d_9=0.02736$ | 1.58267 | 46.5 |
|  | $r_{15}=+0.357314$ | $l_6=0.38750$ |  |  |
| $L_X$ | $r_{16}=-0.398065$ | $d_{10}=0.03648$ | 1.75520 | 27.5 |
| $L_{XI}$ | $r_{17}=+4.277530$ | $d_{11}=0.15888$ | 1.70187 | 40.98 |
|  | $r_{18}=-0.515788$ | $l_7=0.00294$ |  |  |
| $L_{XII}$ | $r_{19}=+23.371700$ | $d_{12}=0.11828$ | 1.74400 | 44.9 |
|  | $r_{20}=-0.964519$ |  |  |  |

I claim:
1. A four-member lens system which in conjunction with the part-system behind the diaphragm of a photographic objective of the Gauss type (modified in certain cases), called the basic objective, which part-system comprises a meniscus-shaped dispersive component turning its convex surface bordering on air towards the image side, and a collective outer component, produces a photographic objective which with equal focal intercept shows a shorter focal length than the basic objective, said lens system consisting of a meniscus-shaped dispersive front component, of a biconvex collective second component, of a meniscus-shaped collective third component, and of a meniscus-shaped dispersive fourth component, the three said meniscus-shaped members each turning their convex sides towards the front, and the said front component consisting of two lenses of opposing refractive powers cemented to each other, the dispersion of the glass of the collective lens of said front component being greater than the dispersion of the glass of said dispersive lens cemented to it, the said fourth component being composed of two lenses of opposing refractive powers cemented to each other, the dispersion of the glass of the dispersive member of said fourth component being greater than the dispersion of the glass of the collective member cemented to it, the two radii of the external surfaces bordering on air of said fourth member differing from each other by not more than 15% of the focal length of the entire objective, and the vertex distance of the collective surface bordering on air of the said fourth member from the collective surface bordering on air of the said meniscus-shaped dispersive component of the remaining part-system of the basic objective lying between the limits of 35 and 55%, and the arithmetic mean of the absolute values of the said collective surfaces lying between 35 and 55% of the focal length of the whole objective, while the vertex distance of the two concave surfaces bordering on the diaphragm space lies between the limits of 35% and 70% of the harmonic mean of the absolute values of the radii of these two latter surfaces.

2. A lens system according to claim 1, at least one of the lens members cemented together in the front component consisting of a glass of $n$-value greater than 1.65 and at least one of the lens members cemented together in the fourth component consisting of a glass of $n$-value less than 1.65.

3. A lens system according to claim 1, the second and the third component being single uncemented lenses and consisting of a glass of $n$-value less than 1.65.

4. A lens according to claim 1, the individual surface refractive powers ($\Delta n/r$) of this lens system and of the part-system standing behind the diaphragm differing by a maximum of $\pm 0.5/f$ and the thicknesses ($d$) and the air spaces ($l$) differing by a maximum of $\pm 0.1 \cdot f$ from the values obtainable from the appended numerical example:

| Lenses | Radii | Thicknesses and Separations | $n_d$ | $V$ | $\Delta n/r$ |
|---|---|---|---|---|---|
| $L_I$ | $r_1 = +1.517700 \cdot f$ | $d_1 = 0.15153 \cdot f$ | 1.74000 | 28.2 | $+0.487580/f$ |
|  | $r_2 = +6.129710 \cdot f$ | $d_2 = 0.03031 \cdot f$ | 1.72005 | 50.3 | $-0.003254/f$ |
| $L_{II}$ | $r_3 = +0.687765 \cdot f$ |  |  |  | $-1.046941/f$ |
|  |  | $l_1 = 0.66042 \cdot f$ |  |  |  |
|  | $r_4 = +0.829261 \cdot f$ | $d_3 = 0.09386 \cdot f$ | 1.56399 | 58.1 | $+0.680111/f$ |
| $L_{III}$ | $r_5 = -4.277530 \cdot f$ |  |  |  | $+0.131849/f$ |
|  |  | $l_2 = 0.09092 \cdot f$ |  |  |  |
|  | $r_6 = +1.702890 \cdot f$ | $d_4 = 0.15153 \cdot f$ | 1.50137 | 56.5 | $+0.294423/f$ |
| $L_{IV}$ | $r_7 = -2.777720 \cdot f$ |  |  |  | $-0.180497/f$ |
|  |  | $l_3 = 0.03031 \cdot f$ |  |  |  |
|  | $r_8 = +0.386767 \cdot f$ | $d_5 = 0.05767 \cdot f$ | 1.56384 | 60.7 | $+1.457828/f$ |
| $L_V$ |  |  |  |  | 0.000000 |
|  | $r_9 = \infty$ | $d_6 = 0.01824 \cdot f$ | 1.56732 | 42.8 |  |
| $L_{VI}$ | $r_{10} = +0.307207 \cdot f$ |  |  |  | $-1.846702/f$ |
|  |  | $l_4 = 0.17271 \cdot f$ |  |  |  |
|  | $r_{16} = -0.398065 \cdot f$ |  |  |  | $-1.897177/f$ |
| $L_X$ |  | $d_{10} = 0.03648 \cdot f$ | 1.75520 | 27.5 | $-0.012467/f$ |
|  | $r_{17} = +4.277530 \cdot f$ | $d_{11} = 0.15888 \cdot f$ | 1.70187 | 40.98 |  |
| $L_{XI}$ | $r_{18} = -0.515788 \cdot f$ |  |  |  | $+1.360772/f$ |
|  |  | $l_7 = 0.00294 \cdot f$ |  |  |  |
|  | $r_{19} = +23.371700 \cdot f$ | $d_{12} = 0.11828 \cdot f$ | 1.74400 | 44.9 | $+0.031833/f$ |
| $L_{XII}$ | $r_{20} = -0.964519 \cdot f$ |  |  |  | $+0.771368/f$ |

$r_1 \ldots r_{10}$ being the radii of, and
$d_1 \ldots d_6$ being the glass and air distances between the individual surfaces of the four lens system,
$r_{16} \ldots r_{20}$ being the radii of and
$d_{10} \ldots d_{12}$ being the glass and air distances between the individual surfaces of the part system of the basic system,
$n_d$ being refractive indices,
$V$ being the Abbe numbers, and
$\Delta n/r$ the refractive powers of the refractive surfaces.

References Cited in the file of this patent

UNITED STATES PATENTS

| 2,169,130 | Tronnier et al. | Aug. 8, 1939 |
| 2,184,018 | Ort | Dec. 19, 1939 |
| 2,582,085 | Tolle | Jan. 8, 1952 |
| 2,662,447 | Tronnier | Dec. 15, 1953 |

FOREIGN PATENTS

| 472,234 | Germany | Mar. 5, 1929 |
| 1,102,390 | France | May 4, 1955 |